United States Patent [19]

Suler

[11] 3,924,986

[45] Dec. 9, 1975

[54] CONTROL SYSTEM FOR INJECTION MOLDING APPARATUS

[75] Inventor: Ladislav Suler, Belleville, Canada

[73] Assignee: Bata Shoe Company, Inc., Belcamp, Md.

[22] Filed: Oct. 29, 1974

[21] Appl. No.: 518,795

[30] Foreign Application Priority Data
Oct. 29, 1973 Canada.............................. 184459

[52] U.S. Cl............................... 425/451.2; 425/119
[51] Int. Cl.²......................... B29C 1/00; B29H 7/08
[58] Field of Search........ 425/119, 129 S, 135, 150, 425/242 R, 249, 437, 127, 451.2; 18/42 H, 34 S

[56] References Cited
UNITED STATES PATENTS

| | | | |
|---|---|---|---|
| 3,044,122 | 7/1962 | Webb et al. | 425/119 X |
| 3,056,165 | 10/1962 | Berrill et al. | 425/119 |
| 3,082,478 | 3/1963 | Hawkins | 425/119 |
| 3,284,558 | 11/1966 | Ludwig | 425/119 X |
| 3,299,476 | 1/1967 | McIlvin | 425/129 S X |
| 3,564,659 | 2/1971 | Koch et al. | 425/119 X |

Primary Examiner—J. Howard Flint, Jr.
Attorney, Agent, or Firm—Oblon, Fisher, Spivak, McClelland & Maier

[57] ABSTRACT

A pneumatic-hydraulic control system for an apparatus for molding a shoe sole, in which a mold cavity is formed by a first fixed mold and a second mold movable relative to the first mold for opening and closing the mold cavity includes a mold operating cylinder with an operating piston movable therein, a piston rod connecting the operating piston to the second mold and a line connecting one side of the operating piston to a source of operating fluid for moving the second mold towards the first mold. A control cylinder with a control piston therein has one end in fluid communication with the operating cylinder and another end in fluid communication with the source of operating fluid, whereby the control piston moves in unison with the operating piston. A valve is provided in the line connecting the source of operating fluid to the operating cylinder for preventing the return of fluid to the reservoir from the operating cylinder when the second mold and operating piston are moving away from the first mold. An adjustable stop in the form of a knurled nut is connected to the piston rod of the control piston for limiting movement of such piston and consequently of the operating piston and the second mold away from the first mold.

2 Claims, 2 Drawing Figures

CONTROL SYSTEM FOR INJECTION MOLDING APPARATUS

BACKGROUND OF THE INVENTION

1. Field of the Invention

This invention relates to a control system for an injection molding apparatus, and in particular to a system for controlling the closing and opening of a mold for producing shoe soles.

During the production of shoe soles using a thermoplastic material such as polyvinyl chloride or polyurethane, it is often necessary to control the opening of the mold quite accurately. For example, according to one method of molding microcellular material, a mold cavity is filled with a predetermined quantity of the sole material and the material is heat cured in the mold. During heat curing, the top mold moves upwardly while the material expands to its final size. The amount of movement, i.e. the mold opening during expansion must be accurately controlled. Otherwise, the thickness of the finished soles varies over wide ranges which not only results in non-uniform products, but may be uneconomical if some of the soles have to be rejected. When squash molding microcellular material, the initial volume of the mold cavity may be larger than the desired final sole size, i.e., the mold is partly opened. A predetermined quantity of microcellular material is injected into the mold, and the mold is fully closed to define a mold cavity of the desired final sole size, squashing the molding material.

With either method, it must be possible to open or close the mold by a precise amount. At present, such controlled mold opening or closing is effected by providing a first piston-cylinder arrangement for closing and opening the mold, and a second piston-cylinder arrangement for moving a portion of the mold, e.g., the mold bottom through a short distance. By providing a microswitch for closing by the movable mold bottom, the second piston-cylinder arrangement can be locked in a desired position, the switch closing a valve in the hydraulic circuit for moving the mold bottom.

2. Description of the Prior Art

One such apparatus is disclosed by U.S. Pat. No. 3,564,659, which issued to F. Koch et al on Feb. 23, 1971. The Koch et al apparatus includes fixed and movable molds, the movable mold being connected to a large cylinder for moving the mold toward and away from the fixed mold. Pressure is supplied to the large cylinder via a valve to clamp the mold closed and to exhaust the clamping pressure to permit controlled movement of the movable mold away from the fixed mold. A control piston moves in consonance with the large piston through a distance which is a large multiple of the distance through which the large piston moves. The control piston operates a switch as the piston moves away from the piston to close the valve and terminate movement of the movable mold away from the fixed mold.

The problem with such apparatus is that they rely on external switches and a relatively complicated hydraulic or electro-mechanical circuit for successful operation. More specifically, the control piston moves rapidly upwardly, so that a cam engages the microswitch, and as a result, there is an inertia problem to overcome. Moreover, the cam could override the switch, and thus, when moving in the reverse direction would not move the switch to its vertical position at the same time, in each cycle. Finally, the cut-off point in the molding cycle can be adjusted by moving the switch. However, such a method of adjusting the cut-off point for mold piston movement is bound to be inaccurate.

SUMMARY OF THE INVENTION

The object of the present invention is to overcome the above problem by providing a relatively simple control system for an injection molding apparatus, which ensures that movement of a mold operating piston is accurately controlled in the same manner during successive molding operations.

Accordingly, the present invention relates to a control system for a molding apparatus, in which a mold cavity is formed by a first mold and a second mold movable relative to the first mold for opening and closing the mold operating cavity. The control system includes a mold cylinder with an operating piston movable therein, a piston rod connecting the operating piston to the second mold. Fluid is supplied from a source of operating fluid to the operating cylinder on one side of the operating piston for moving the second mold towards the first mold. A control cylinder with a control piston therein has one end in fluid communication with the operating cylinder and another end in fluid communication with the source of operating fluid, whereby the control piston moves in unison with the operating piston. A valve is provided in the line connecting the source of operating fluid to the operating cylinder for preventing the return of fluid to the reservoir from the mold cylinder, when the second mold and operating piston are moving in one direction relative to the first mold and an adjustable stop means is connected to the control piston for limiting movement of the control piston and consequently of the operating piston and the second mold relative to the first mold element. In this embodiment of the invention, the valve is closed by a solenoid, the latter being operated by a timer and/or switch actuated by the second mold.

In one embodiment of the invention, a switch is provided for closing by the second mold during movement of the latter away from the first mold. Upon closing of the switch, the solenoid is actuated to close the valve in the by-pass line connecting the operating cylinder to the reservoir. Alternatively, a switch can be closed when the mold is closed to actuate the solenoid, which closes the valve and thus limits the extent of movement of the second mold relative to the first mold.

BRIEF DESCRIPTION OF THE DRAWINGS

The invention will now be described in greater detail with reference to the accompanying drawings, wherein:

With reference to FIG. 1, the control system is used to control the movement of a top mold 1 relative to a bottom mold 2. The mold elements 1 and 2 in combination with a heel cleat 3 form a mold cavity when the mold is closed.

DESCRIPTION OF THE PREFERRED EMBODIMENTS

Figure 1:
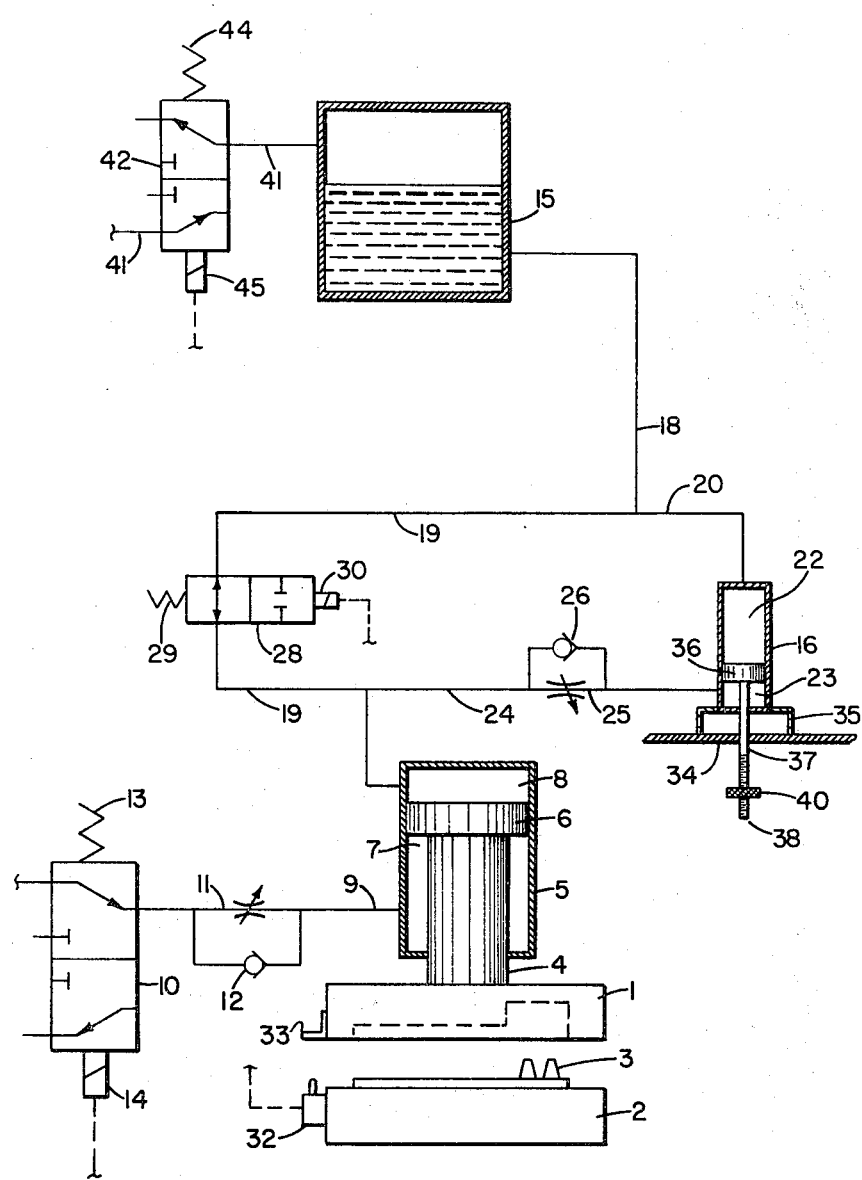
FIG. 1 is a schematic view of a part of a molding apparatus incorporating a control system in accordance with the present invention.

The top mold 1 is dependent from a piston rod 4 of a operating cylinder 5, which contains an operating piston 6 dividing the interior of the cylinder into two chambers 7 and 8. Upward movement of the piston 6 and thus of the rod 4 and the top mold 1 is effected by means of air fed into the chamber 7 with an air line 9 connected to an air source (not shown). The flow of air into and out of the chamber 7 is controlled by a three-way valve 10 and an adjustable flow control valve 11 provided with a by-pass 12. The flow control valve 11 determines the speed of upward movement of the operating piston. The by-pass 12 permits full flow in the exhaust direction, i.e. facilitates emptying of the chamber 7. The valve 10, which is a spring return valve is biased to a normally open position by a spring 13, i.e., air is fed into the chamber 7 to bias the piston 6 in an upward direction. By energizing a solenoid 14, the valve 10 is moved to a second position in which air is exhausted from the chamber 7.

The other chamber 8 of the cylinder 5 is in fluid communication with a hydraulic fluid reservoir 15 and with a control cylinder 16. Hydraulic fluid is fed from the reservoir 15 via lines 18, 19 and 20 to the mold operating cylinder 5 and the control cylinder 16, respectively. The line 20 enters a top chamber 22 of the control cylinder 16, and the line 19 is connected to a bottom chamber 23 by a line 24. A flow control valve 25 with a by-pass 26 is provided in the line 24. The by-pass 26 permits full flow in the direction from the chamber 23 to the line 19. The flow of fluid in the line 19 is controlled by a two-way valve 28, which is normally biased to an open position by a spring 29. The valve 28 is closed by a solenoid 30, which is actuated by a microswitch 32 mounted on the bottom mold 2 and an associated lug 33 on the top mold 1.

The control cylinder 16 is mounted on a fixed plate 34 of the mold machine frame by means of a bracket 35. The cylinder 16 contains piston 36, which divides the cylinder into the chambers 22 and 23. A piston rod 37 extends downwardly through the bottom end of the cylinder 16 and the fixed plate 34, and is provided with a threaded lower free end 38 onto which a knurled nut 40 is threaded.

The flow of hydraulic fluid from the reservoir 15 is controlled by an air source (not shown) connected to the reservoir by a line 41. A spring loaded threeway valve 42 controls the flow of air through the line 41. The valve 42 is normally maintained in a closed position by a spring 44, i.e. no air under pressure is supplied to the upper end of the reservoir 15. By energizing a solenoid 45, the valve 42 is opened to feed air into the reservoir 15 and force hydraulic fluid through the line 18.

Figure 2:
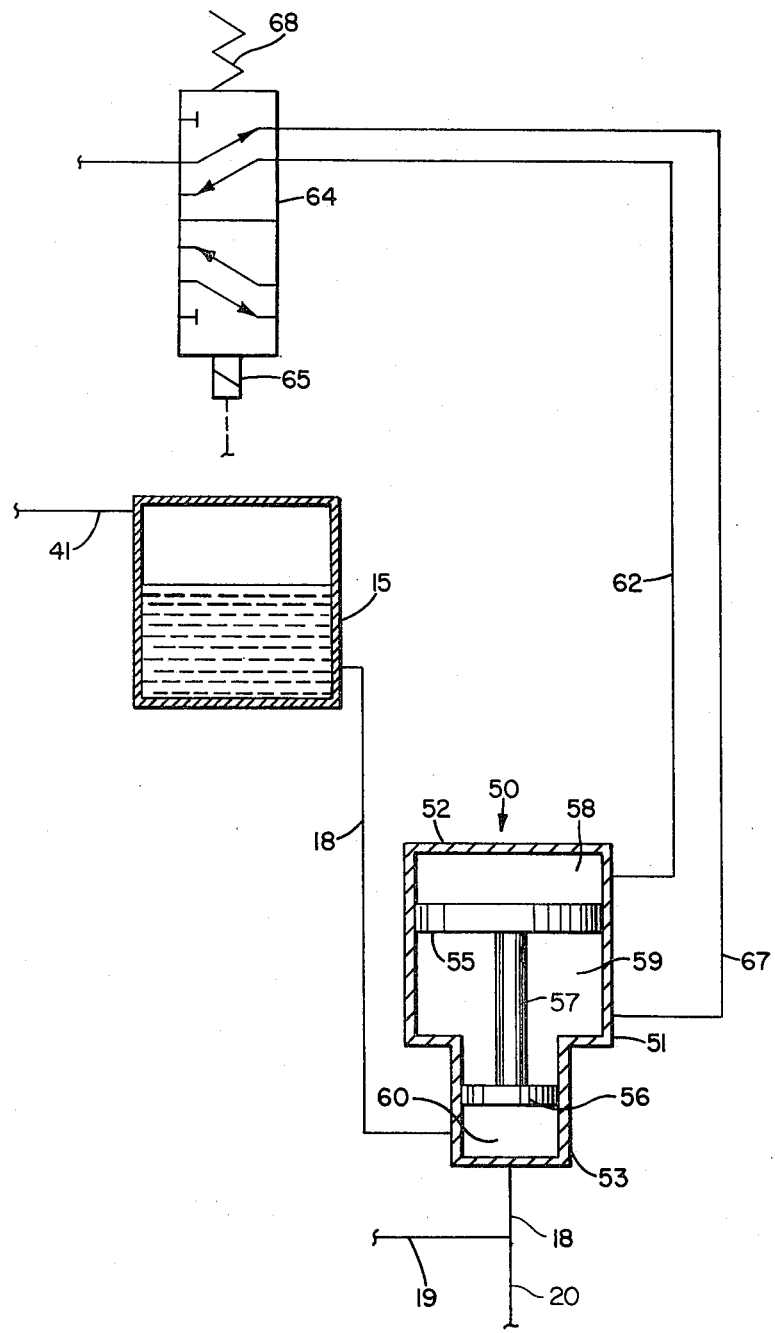
FIG. 2 is a schematic view of a booster system for use in the apparatus of FIG. 1.

Referring to FIG. 2, a booster system for use in the apparatus of FIG. 1 will now be described. The booster system includes a pressure intensifier, generally indicated at 50, which is inserted in the line 18 between the reservoir 15 and the cylinders 5 and 16. The pressure intensifier 50 is in the form of a stepped or differential cylinder 51 including a large diameter upper end 52 and a smaller diameter lower end 53. A piston assembly, including a piston 55 and a ram 56 interconnected by a rod 57, is slidably mounted in the cylinder 51. The piston 55 slides in the upper end 52 of the cylinder 51, and the ram 56 slides in the lower end 53 thereof. The piston 55 and ram 56 divide the cylinder 51 into three chambers 58, 59 and 60. In normal operation, oil is fed from the reservoir 15 via line 18 through the lower chamber 60 of the cylinder 51.

When the mold is closed and, in particular, during molding, there is high pressure in the mold caused by injection. In order to maintain the mold in a closed position, it is necessary to apply an even higher clamping or locking pressure to the top mold 1. Thus, the booster system is actuated by feeding air into the upper chamber 58 of the cylinder 51 via a line 62 and a spring loaded four-way valve 64.

During a molding operation, air under pressure is fed into the upper chamber 58 of the cylinder 51 via the line 62 by actuating a solenoid 65 to open the line 62 with respect to a source (not shown) of air under pressure while opening a line 67 to the atmosphere. Thus, the piston assembly moves downwardly in the cylinder 51 closing the line 18 from the reservoir 15, and fluid in the lines 19 and 20 is compressed.

Upon completion of the molding operation, the upper chamber 58 of the cylinder 51 is evacuated by means of the valve 64, which is moved from the open position with respect to line 62 to an open position with respect to a line 67 and the chamber 59 by deactivating the solenoid 65, a spring 68 forcing the valve 64 to the required position. Thus, air is discharged from the chamber 58, while air under pressure is fed into the chamber 59 to cause the piston assembly to move rapidly upwardly opening the line 18.

Because of the relatively large area of the piston 55 and the small area of ram 56, a low air pressure applied to the top of the piston 55 results in a high pressure on the fluid in the lines 18 and 19. The pressure intensification is directly proportional to the relative surface areas of the piston 55 and the ram 56. Such pressure intensifiers are commercially available, off the shelf items.

Referring again to FIG. 1, in operation with the mold in an open condition, air is fed into the reservoir 15 via the line 41 and the valve 42 to force hydraulic fluid through the lines 18, 19 and 20, and the normally open valve 28 into the mold operating and control cylinders 5 and 16, respectively. Thus, the mold is closed by movement of the top mold 1 against the bottom mold 2. Following injection of material into the mold and during curing, the top mold element 1 moves upwardly because of the pressure created in the mold cavity by expansion of the material being molded.

In some cases, there is sufficient pressure created in the mold cavity to move the top mold element 1 away from the bottom mold element 2. However, if the pressure is insufficient which will depend on the expansibility of the material being molded, air under pressure is fed into the chamber 7 of the mold operating cylinder 5 via the line 9 to assist upward movement of the top mold element 1.

When the top mold element 1 begins to rise, the switch 32 is closed to immediately actuate the solenoid 30, closing the valve 28 and opening the valve 42 to vent the top of the reservoir 15 to the atmosphere (i.e., moving the valve 42 to the position shown in FIG. 1). Fluid leaving the top chamber 8 of the cylinder 5 flows through the line 24 to the bottom chamber 23 of the control cylinder 16 causing the piston 36 to move upwardly until movement of the piston rod 37 and the piston 3 is stopped by the nut 40 running into the plate 34. At the same time, upward movement of the operating piston 6 and top mold 1 is also stopped, since fluid can no longer escape from the chamber 8.

Thus, a positive stop for the operating piston 6 and top mold 1 is provided. By adjusting the position of the nut 40 on the piston rod 37, the stroke of the top mold 1 can be accurately controlled. Since the volume of the mold operating cylinder 5 is a large multiple of the volume of the control cylinder 16, a small movement of the operating piston 6 results in a corresponding large movement of the control piston 36. Thus, very accurate control of top mold movement can readily be effected merely by moving the knurled nut 40 along the piston rod 37.

The apparatus of the present invention can be used in a squash molding method, wherein the mold is first closed by moving the top mold 1 downwardly against the bottom mold 2, the mold is controllably opened, injection into the mold cavity is effected, and the mold is again closed tight, with or without a booster, to effect squashing. In other words, using the above-described system, the mold is opened a predetermined amount before or during injection and before squashing. The use of the booster permits the use of a much smaller mold cylinder than would otherwise be the case.

When used in a squash molding method, the switch 32 attached to the bottom mold 2 would be closed by the lug 33 upon closing of the mold. This action would actuate the solenoid 30 closing the valve 28 and opening the valve 42 to vent the reservoir 15 to the atmosphere. Thus, using the apparatus of the present invention, a squash molding method would include the steps of closing the mold to close the switch 32 and thus the valve 28, opening of the valve 42 to vent the reservoir 15 to the atmosphere and opening of the valve 10 to the source of air under pressure to introduce air into the chamber 7 via the line 9. Injection is simultaneously started. The pressure of injection of thermoplastic material into the mold, assisted by air fed into the chamber 7 causes the operating piston 6 and the top mold 1 to rise to a position predetermined by the location of the stop nut 40 on the piston rod 37 of the control cylinder 16. Upon termination of injection of the molding material into the mold cavity, the valve 28 is opened, the valve 10 is moved to a position where the chamber 7 is vented to the atmosphere, and the valve 42 is moved to a position where air under pressure can be fed into the reservoir through the line 41. The material in the mold is then squashed, with or without the booster. If the booster is employed, then the booster is actuated at the same time as the valve 28 is opened and the reservoir 15 is pressurized.

It will be appreciated that the switch 32 for actuating the solenoid 30 is placed in a circuit (not shown) with the solenoid 30, and that such circuit may include a timer for controlling the operation of the apparatus in a predetermined manner. Moreover, the switch 32 may be replaced with a timer circuit for controlling the operation of the various valves in accordance with a predetermined schedule, which will depend, inter alia, upon the nature of the material being molded and the required movement of the top mold 1 relative to the bottom mold 2.

Thus, there has been described a relatively simple control system for controlling the closing and opening of a mold for producing shoe soles. The system provides a positive stop for the movement of a control piston, and thus for a operating piston and, in this case, a top mold.

I claim:

1. A control system for a molding apparatus, in which a mold cavity is formed by a first fixed mold and a second mold movable relative to the first mold for opening and closing the mold cavity, the control system comprising a mold operating cylinder with an operating piston movable therein; a piston rod connecting the operating piston to the second mold; supply means for connecting said operating cylinder on one side of the operating piston to a source of operating fluid for moving the second mold towards the first mold; a control cylinder with a control piston therein having one end in fluid communication with the operating cylinder and another end in fluid communication with the source of operating fluid, whereby the control piston moves in unison with the operating piston; a valve in said supply means for preventing the return of fluid to the reservoir from the operating cylinder when the second mold and operating piston are moving towards the first mold; and an adjustable stop means connected to the control piston for directly limiting movement thereof and consequently of the operating piston and the second mold away from the first mold.

2. A control system according to claim 1, including switch means associated with said first and second molds for closing said valve in the supply means in response to movement of one mold relative to the other mold.

* * * * *